UNITED STATES PATENT OFFICE 2,480,455

TREATMENT OF ALUMINUM FOIL FOR BONDING, PRINTING, AND COLORING

Frank L. Eichner, Hollis, N. Y., assignor to Reynolds Metals Company, Richmond, Va., a corporation of Delaware No Drawing. Application December 19, 1946, Serial No. 717,321

2 Claims. (Cl. 148—13)

This invention relates to the manipulation of coils of aluminum foil in preparation for the bonding, coloring and printing of webs of aluminum foil, and has for its object the provision of an improved method of treating and uncoiling the coils.

When coils of aluminum foil webs have been annealed and permitted to cool to room temperature or lower and then uncoiled, the webs that are bonded to sheet material, such as paper webs, or run through a printing or coloring operation usually contain sticky edges, wrinkles or other surface irregularities which result in an inferior product. This invention is based upon my discovery that when coils of aluminum foil are cooled to a temperature not lower than 100° F. or to any temperature above 100° F. which permits handling, uncoiled at such temperature, and then run through bonding, printing or coloring operations, the foil is dead flat and substantially free of sticky edges, wrinkles and other surface irregularities. My invention accordingly comprises the steps of annealing coils of aluminum foil webs followed by cooling the coils to a temperature not below around 100° F., unwinding the coils while at such temperature, and then subjecting the webs of foil to a bonding, printing, or coloring operation. My invention applies to both single webs of foil or to the double-foil webs, such as two foils rolled together, and to foils of various thicknesses varying, say, from 0.0003 to 0.006 inch. In removing the hardness resulting from the foil rolling operation, the metal is usually heated to temperatures around 800° F. and then permitted to cool for a prolonged period of time. When this metal cools to room temperature or lower, it will have the properties of unevenness even if reheated to a temperature of 100° F. or higher. I prefer, therefore, to carry out my invention in close combination with annealing, and to bond the foil to other material, or to subject it to coloring or printing as soon as practicable after the temperature falls to around 100° F. or suitable temperature thereabove. When the coil of foil is treated according to my invention, it unwinds and separates freely.

My invention may be applied advantageously in the bonding or laminating operations described in the copending applications of Richard S. Reynolds, Serial Nos. 705,175 and 705,176, filed October 23, 1946. In accordance with these inventions webs of foil are coated with adhesives of various kinds, such as adhesives dissolved in solvents which are removed by evaporation in a current of heated air, thermoplastic adhesives, etc. My invention is especially applicable to such bonding operations.

My invention effects a material saving by reducing the scrap losses resulting from excessive unevenness, sticky edges, and wrinkles in the foil before it is bonded, printed, or colored. My invention applies to the commercially pure aluminum or to alloys of aluminum of the types widely used at this time in the manufacture of foil webs and to other suitable forms of aluminum.

I claim:

1. In the uncoiling of webs of aluminum foil for bonding, printing or coloring operations, the improvement which comprises heating a coil of aluminum foil to an annealing temperature, cooling the coil to a temperature which permits handling but not lower than 100° F. and then uncoiling the coil while at such latter temperature.

2. In the uncoiling of webs of aluminum foil for bonding, printing or coloring operations, the improvement which comprises heating a coil of aluminum foil to an annealing temperature, cooling the coil to a temperature which permits handling but not lower than 100° F., uncoiling the coil while at such latter temperature, and then passing the web of aluminum foil to one of the operations consisting of bonding, printing and coloring.

FRANK L. EICHNER.

REFERENCES CITED

The following references are of record in the file of this patent:

UNITED STATES PATENTS

| Number | Name | Date |
| --- | --- | --- |
| 1,178,863 | Lauber | Feb. 11, 1916 |
| 2,106,178 | Keller et al. | Jan. 25, 1938 |
| 2,189,836 | Schon | Feb. 13, 1940 |